US010812877B2

(12) United States Patent
Jadidi et al.

(10) Patent No.: US 10,812,877 B2
(45) Date of Patent: Oct. 20, 2020

(54) SYSTEM AND METHOD FOR CALIBRATION-LESSLY COMPENSATING BIAS OF SENSORS FOR LOCALIZATION AND TRACKING

(71) Applicant: FUJI XEROX CO., LTD., Tokyo (JP)

(72) Inventors: Maani Ghaffari Jadidi, Ann Arbor, MI (US); Miteshkumar Patel, San Jose, CA (US); Jacob Biehl, San Jose, CA (US); Andreas Girgensohn, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/595,931

(22) Filed: May 15, 2017

(65) Prior Publication Data

US 2018/0332369 A1 Nov. 15, 2018

(51) Int. Cl.
*H04Q 9/00* (2006.01)
*H04W 4/02* (2018.01)
*H04W 4/024* (2018.01)

(52) U.S. Cl.
CPC ........... *H04Q 9/00* (2013.01); *H04Q 2209/43* (2013.01)

(58) Field of Classification Search
None
See application file for complete search history.

(56) References Cited

U.S. PATENT DOCUMENTS

| 9,709,404 B2* | 7/2017 | Roumeliotis | ........ G01C 21/165 |
| 2007/0183670 A1 | 8/2007 | Owechko et al. | |
| 2008/0054158 A1 | 3/2008 | Ariyur et al. | |
| 2013/0095849 A1 | 4/2013 | Pakzad | |
| 2014/0214427 A1* | 7/2014 | Chao | ....................... G10L 15/30 704/270.1 |

(Continued)

OTHER PUBLICATIONS

C. Forster, L. Carlone, F. Dellaert, D. Scaramuzza, "IMU Preintegration on Manifold for Efficient Visual-Inertial Maximum-a-Posteriori Estimation," in Robotics: Science and Systems XI, Sapienza University of Rome, Rome, Italy, Jul. 13-17, 2015, 2015.

(Continued)

*Primary Examiner* — Curtis A Kuntz
*Assistant Examiner* — Jerold B Murphy
(74) *Attorney, Agent, or Firm* — Procopio, Cory, Hargreaves & Savitch LLP

(57) ABSTRACT

A probabilistic motion model to calculate the motion parameters of a user's hand held device using a noisy low cost Inertial Measurement Unit (IMU) sensor. Also described is a novel technique to reduce the bias noise present in the aforesaid IMU sensor signal, which results in a better performance of the motion model. The system utilizes a Particle Filter (PF) loop, which fuses radio signal data accumulated from Bluetooth Low Energy (BLE) beacons using BLE receiver with the signal from IMU sensor to perform localization and tracking. The Particle Filter loop operates based on a Sequential Monte Carlo technique well known to persons of ordinary skill in the art. The described approach provides a solution for both the noise problem in the IMU sensor and a motion model utilized in the Particle Filter loop, which provides better performance despite the noisy IMU sensor.

21 Claims, 3 Drawing Sheets

(56) References Cited

U.S. PATENT DOCUMENTS

| | | | |
|---|---|---|---|
| 2015/0350849 A1* | 12/2015 | Huang | H04W 4/04 455/456.1 |
| 2017/0241787 A1* | 8/2017 | Trigoni | G01C 21/12 |
| 2017/0269189 A1* | 9/2017 | Swindell | G01S 1/024 |
| 2018/0292216 A1 | 10/2018 | Jimenez Gonzalez et al. | |

OTHER PUBLICATIONS

Y. Gu, A. Lo, I. Niemegeers, "A survey of indoor positioning systems for wireless personal networks," IEEE Commun. Surv. Tutor., vol. 11, No. 1, pp. 13-32, First 2009.

I. Vallivaara, J. Haverinen, A. Kemppainen, J. Röning, "Magnetic field-based SLAM method for solving the localization problem in mobile robot floor-cleaning task," in 2011 15th International Conference on Advanced Robotics (ICAR), 2011, pp. 198-203.

F. Li, C. Zhao, G. Ding, J. Gong, C. Liu, F. Zhao, "A Reliable and Accurate Indoor Localization Method Using Phone Inertial Sensors," in Proceedings of the 2012 ACM Conference on Ubiquitous Computing, New York, NY, USA, 2012, pp. 421-430.

"Robotics Institute: Wifi localization and navigation for autonomous indoor mobile robots." [Online]. Available: http://www.ri.cmu.edu/publication_view.html?pub_id=6819. [Accessed: Jan. 25, 2017].

N. Ravi, P. Shankar, A. Frankel, A. Elgammal, L. Iftode, "Indoor Localization Using Camera Phones," in Seventh IEEE Workshop on Mobile Computing Systems Applications (WMCSA '06 Supplement), 2006, pp. 49-49.

P. Mirowski, T. K. Ho, S. Yi, M. MacDonald, "SignalSLAM: Simultaneous localization and mapping with mixed WiFi, Bluetooth, LTE and magnetic signals," in International Conference on Indoor Positioning and Indoor Navigation, 2013, pp. 1-10.

J. Racko, P. Brida, A. Perttula, J. Parviainen, J. Collin, "Pedestrian Dead Reckoning with Particle Filter for handheld smartphone," in 2016 International Conference on Indoor Positioning and Indoor Navigation (IPIN), 2016, pp. 1-7.

H. Nurminen, A. Ristimäki, S. Ali-Löytty, R. Piché, "Particle filter and smoother for indoor localization," in International Conference on Indoor Positioning and Indoor Navigation, 2013, pp. 1-10.

T. Lupton, S. Sukkarieh, "Visual-Inertial-Aided Navigation for High-Dynamic Motion in Built Environments Without Initial Conditions," IEEE Trans. Robot., vol. 28, No. 1, pp. 61-76, Feb. 2012.

M. Hwangbo, J. S. Kim, T. Kanade, "IMU Self-Calibration Using Factorization," IEEE Trans. Robot., vol. 29, No. 2, pp. 493-507, Apr. 2013.

E. Nebot, H. Durrant-Whyte, "Initial calibration and alignment of low-cost inertial navigation units for land vehicle applications," J. Robot. Syst., vol. 16, No. 2, pp. 81-92, Feb. 1999.

Dellaert, Frank, "Factor graphs and GTSAM: A hands-on introduction," Georgia Institute of Technology, 2012.

Office Action for related U.S. Appl. No. 15/726,371, dated Feb. 13, 2020, 32 pages.

Svensson Andreas, "Particle Filter Explained without Equations", Oct. 8, 2013, YouTube, https://www.youtube.com/watch?v=aUkBa1ZMKv4, pp. 1-35 (Year: 2013).

* cited by examiner

SYSTEM AND METHOD FOR CALIBRATION-LESSLY COMPENSATING BIAS OF SENSORS FOR LOCALIZATION AND TRACKING

BACKGROUND OF THE INVENTION

Technical Field

The disclosed embodiments relate in general to localization and tracking systems and methods and, more specifically, to system and method for calibrationlessly compensating bias of inertial measurement unit sensor for localization and tracking.

Description of the Related Art

The spreading of personal communication systems into many public and private places, as well as the onset of new generation of smartphones, has enabled the development of a vast number of indoor positioning systems based on standard wireless communication technologies, see, for example, Y. Gu, A. Lo, and I. Niemegeers, "A survey of indoor positioning systems for wireless personal networks," IEEE Commun. Surv. Tutor., vol. 11, no. 1, pp. 13-32, First 2009. Localization using variety of sensors such as Magnetometer described, for example, in I. Vallivaara, J. Haverinen, A. Kemppainen, and J. Röning, "Magnetic field-based SLAM method for solving the localization problem in mobile robot floor-cleaning task," in 2011 15th International Conference on Advanced Robotics (ICAR), 2011, pp. 198-203, IMU described in F. Li, C. Zhao, G. Ding, J. Gong, C. Liu, and F. Zhao, "A Reliable and Accurate Indoor Localization Method Using Phone Inertial Sensors," in Proceedings of the 2012 ACM Conference on Ubiquitous Computing, New York, N.Y., USA, 2012, pp. 421-430, Radio Frequency (WiFi or BLE) described in "Robotics Institute: Wifi localization and navigation for autonomous indoor mobile robots," images, described in N. Ravi, P. Shankar, A. Frankel, A. Elgammal, and L. Iftode, "Indoor Localization Using Camera Phones," in *Seventh IEEE Workshop on Mobile Computing Systems Applications (WMCSA '06 Supplement)*, 2006, pp. 49-49 and fusion of these sensors as described in P. Mirowski, T. K. Ho, S. Yi, and M. MacDonald, "SignalSLAM: Simultaneous localization and mapping with mixed WiFi, Bluetooth, LTE and magnetic signals," in *International Conference on Indoor Positioning and Indoor Navigation*, 2013, pp. 1-10, has been developed and experimented by different research groups.

As would be appreciated by persons of ordinary skill in the art, each of these sensors has its own limitations in terms of noise, sampling rate, characteristics and/or dimensionality, which pose challenges in terms of generating stable localization. For example, using cameras can raise privacy concerns, which can limit the application of such systems. Moreover, in indoors, radio signals are severely impacted due to shadowing and multipathing effects, which make the available wireless-based positioning systems less accurate. Therefore, in view of the aforesaid limitations of the conventional technology, new and improved systems and methods are needed for stable indoor localization and tracking.

SUMMARY OF THE INVENTION

The embodiments described herein are directed to methods and systems that substantially obviate one or more of the above and other problems associated with conventional localization and tracking systems.

In accordance with one aspect of the inventive concepts described herein, there is provided a computer-implemented method, the method being performed in a computerized system incorporating a central processing unit, a Bluetooth localization signal receiver, a plurality of sensors, separate and distinct from the Bluetooth localization signal receiver, and a memory, the computer-implemented method involving: receiving at least one Bluetooth localization signal using the Bluetooth localization signal receiver; obtaining a plurality of sensor readings using the plurality of sensors; and determining motion parameters of the computerized system based at least on the received Bluetooth localization signal and the received plurality of sensor readings.

In one or more embodiments, the motion parameters of the computerized system are determined based, at least in part, on a probabilistic motion model without requiring a prior calibration of the plurality of sensors.

In one or more embodiments, the method further comprises determining bias parameters associated with the plurality of the sensors, wherein the determining the bias parameters is performed dynamically without regard to a location of the computerized system.

In one or more embodiments, the motion parameters of the computerized system are determined based, at least in part, on a strength of the received Bluetooth localization signal.

In one or more embodiments, determining the motion parameters of the computerized system comprises dynamically updating bias parameters for the plurality of sensors based on the received Bluetooth localization signal.

In one or more embodiments, the bias parameters for the plurality of sensors are updated using the received Bluetooth localization signal.

In one or more embodiments, the bias parameters for the plurality of sensors are updated using an iterative smoothing and mapping algorithm (iSAM).

In one or more embodiments, the bias parameters for the plurality of sensors are updated using a Bluetooth beacon map corresponding to the received Bluetooth localization signal.

In one or more embodiments, the Bluetooth localization signal is a Bluetooth low energy signal corresponding to at least one Bluetooth low energy beacon.

In one or more embodiments, the plurality of sensors are incorporated into an inertial measurement unit (IMU).

In one or more embodiments, the plurality of sensors comprises a magnetometer sensor.

In one or more embodiments, the plurality of sensors comprises an acceleration sensor.

In one or more embodiments, determining the motion parameters of the computerized system comprises continuously executing a particle filter loop and continuously dynamically updating the bias parameters for the plurality of sensors.

In one or more embodiments, continuously executing the particle filter loop and continuously dynamically updating the bias parameters are performed in parallel.

In one or more embodiments, sequentially executing the particle filter loop comprises performing a motion update, performing a measurement update and resampling a plurality of particles.

In one or more embodiments, performing the measurement update comprises calculating a distance between each of a plurality of particles and at least one Bluetooth low energy beacon based on the received Bluetooth localization signal.

In one or more embodiments, performing the measurement update comprises updating a plurality of particles using a confidence of a classifier.

In one or more embodiments, resampling the plurality of particles comprises calculating a weight for each of a plurality of particles and replicating particles of the plurality of particles with higher weights.

In one or more embodiments, continuously dynamically updating the bias parameters for the plurality of sensors comprises generating an optimized Bluetooth beacon map and wherein the optimized Bluetooth beacon map is provided to the particle filter loop.

In one or more embodiments, continuously dynamically updating the bias parameters for the plurality of sensors comprises generating a smoothened trajectory data.

In one or more embodiments, the method further comprises using the motion parameters of the computerized system to generate localization data associated with the computerized system.

In accordance with another aspect of the inventive concepts described herein, there is provided a non-transitory computer-readable medium embodying a set of computer-executable instructions, which, when executed in connection with a system incorporating a central processing unit, a Bluetooth localization signal receiver, an inertial measurement unit, separate and distinct from the Bluetooth localization signal receiver, and a memory, cause the system to perform a method involving: receiving at least one Bluetooth localization signal using the Bluetooth localization signal receiver; obtaining a plurality of sensor readings using the plurality of sensors; and determining motion parameters of the computerized system based at least on the received Bluetooth localization signal and the received plurality of sensor readings.

In accordance with yet another aspect of the inventive concepts described herein, there is provided a system incorporating a central processing unit, a Bluetooth localization signal receiver, an inertial measurement unit, separate and distinct from the Bluetooth localization signal receiver, and a memory, the memory storing a set of computer-readable instructions causing the system to perform a method involving: receiving at least one Bluetooth localization signal using the Bluetooth localization signal receiver; obtaining a plurality of sensor readings using the plurality of sensors; and determining motion parameters of the computerized system based at least on the received Bluetooth localization signal and the received plurality of sensor readings.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Figure 1:
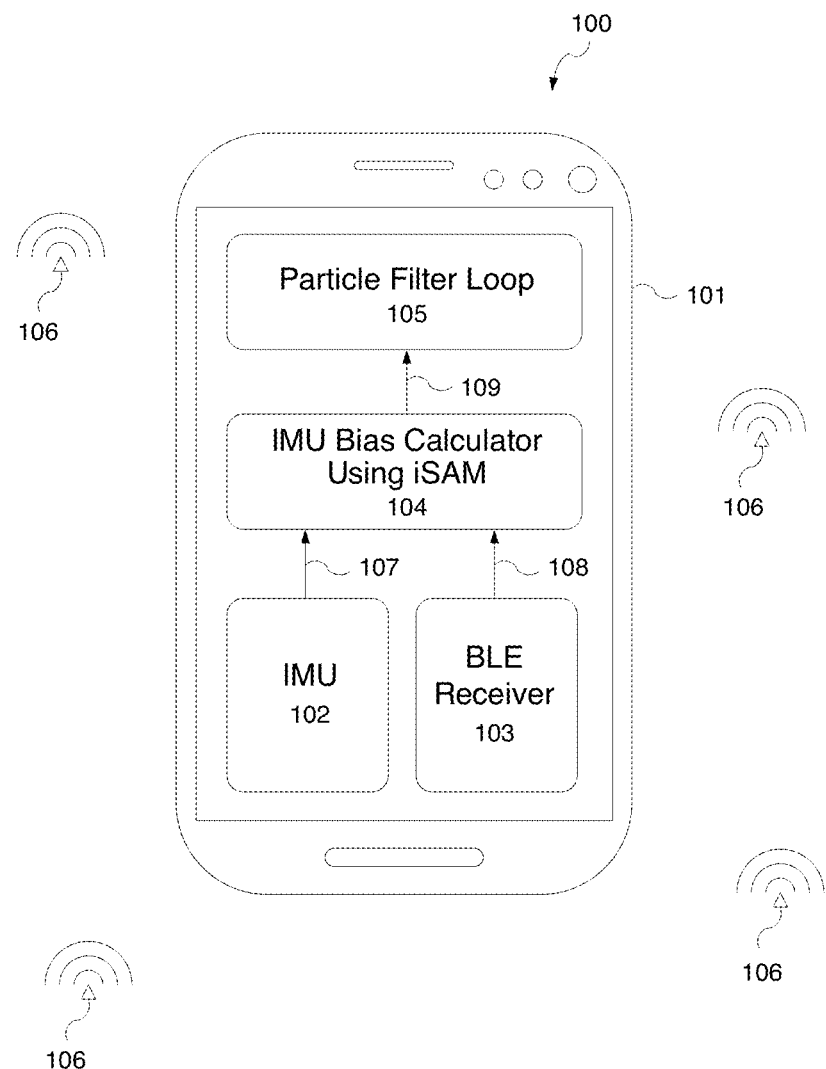
FIG. 1 illustrates an exemplary embodiment of a system based on which the described techniques could be implemented.

In accordance with one aspect of the embodiments described herein, there is provided a novel motion model to calculate the motion parameters of a user's hand held device using a noisy low cost Inertial Measurement Unit (IMU) sensor. Further, in accordance with another aspect of the described embodiments, there is provided a novel technique to reduce the bias noise present in the aforesaid IMU sensor signal, which results in a better performance of the motion model. The described embodiment of the localization system is suitable for GPS-denied indoor environments and includes two main layers (subsystems), which, following the robotic community convention, are called front-end (105 in FIG. 1) and back-end (104 in FIG. 1). FIG. 1 illustrates an exemplary embodiment of a system 100 based on which the described techniques could be implemented.

In one or more embodiments, the aforesaid subsystems 104 and 105 operate in parallel. The first subsystem (105 in FIG. 1) performs localization and tracking of user's hand held device 101 using the aforesaid Particle Filter loop. The described IMU probabilistic motion model determines the direction of motion, which enables the Particle Filter loop 105 to smartly update the state of the particles. The second subsystem (104 in FIG. 1) uses the same information and further optimizes the estimation of the first subsystem 105. It simultaneously solves the problem of generating a more smoothened device 101 trajectory and recovers the precise location of BLE beacons 106 and time varying IMU bias, using a well-known in the art method described, for example, in C. Forster, L. Carlone, F. Dellaert, and D. Scaramuzza, "IMU Preintegration on Manifold for Efficient Visual-Inertial Maximum-a-Posteriori Estimation," in Robotics: Science and Systems XI, Sapienza University of Rome, Rome, Italy, Jul. 13-17, 2015. In one or more embodiments, the calculated IMU bias is fed back into the first subsystem 105, which improves the localization of the hand held device 101 as the residual noise present in the IMU sensors 102 is compensated using the bias parameters 109 generated by the second subsystem 104.

In one embodiment, the described system utilizes a Particle Filter (PF) loop 105 which fuses radio signal data 108 accumulated from Bluetooth Low Energy (BLE) beacons 106 using BLE receiver 103 with the signal 107 from IMU sensor 102 to perform localization and tracking. As would be appreciated by persons of ordinary skill in the art, standard and commercially available smartphones typically are equipped with Bluetooth transceiver, IMU, and magnetometer sensors. The BLE operates in the 2.4 GHz license-free band and uses 40 channels each with a width of 2 MHz; the ideal sampling rate of RSSI is about 10 Hz. In various embodiments, the aforesaid IMU sensor includes a 3-axis accelerometer, that measures the linear acceleration, and a 3-axis gyroscope, that measures the angular velocity, and typically has a sampling rate more than 100 Hz. The magnetometer measures the strength and direction of the local magnetic field and has an exemplary sampling rate about 50 Hz. However, as would be appreciated by persons of ordinary skill in the art, the described systems and methods are capable of operating with both higher and lower sampling rates. Therefore, the invention should be not limited to any specific sampling rate or a range hereof.

The aforesaid Particle Filter loop 105 (the front-end) operates based on a Sequential Monte Carlo technique, well known to persons of ordinary skill in the art as sample Importance Resampling (SIR) filter to solve the problem of global localization and tracking the device trajectory. As would be appreciated by persons of ordinary skill in the art, IMU sensors 102 are inherently noisy and have time varying bias, which varies based on different environmental and/or sensor conditions and hence requires bias parameters to be updated regularly. The described approach provides a solution for both the noise problem in the IMU sensor 102 and a motion model utilized in the Particle Filter loop 105, which provides better performance despite the noisy IMU sensor 102.

Given the current device orientation, the system samples from the IMU dynamics to generate particles along the moving direction. Given a prior map of the BLE beacons and using range measurements converted from BLE RSSI, the system computes importance weights of particles. One embodiment uses a range-only measurement model with additive white Gaussian noise.

Because the IMU has a higher frequency than the BLE receiver, the AHRS solver runs with a higher frequency to use all available measurements, which in turn improves the orientation estimation accuracy. The system samples from the IMU motion model using the latest device orientation with a frequency that is adaptable to the available computational resources (usually the BLE RSSI sampling rate). In this way, without discarding any sensory information, we can track the device within the Particle Filter framework resulting in a superior algorithm for localization.

In one or more embodiments, the Particle Filter loop 105 fuses BLE signal scans and IMU data to estimate localization of and track the hand held device 101 of the user. The BLE scan information is used during a measurement update phase of the Particle Filter whereas the IMU is used to capture the motion and direction in which the user is walking to generate reliable odometry. BLE scans consist of radio frequency (RF) signals emitted by different BLE beacons 106 present in the environment. The signal is effected heavily by different environment factors and hence makes the localization problem challenging. Further, as it is known in the art, IMU sensor 102 is a collection of 9-axis sensors, which provides 3-axis linear acceleration and angular velocity form accelerometer and gyroscope, respectively, as well as 3-axis magnetic field. As would be appreciated by persons of ordinary skill in the art, each of these sensors is noisy and hence cannot be used directly to measure the orientation of the device 101 from raw sensor readings. In addition, the measurement bias of these sensors are time-varying and impacted by various factors, including mechanical stress on the sensor, ambient temperature and the misalignment of the sensor at the time of the installation.

One or more embodiments of the described system incorporate a novel probabilistic IMU motion model, which operates within the aforesaid Particle Filter loop 105. The aforesaid Particle Filter loop 105 utilizes the data supplied by the IMU sensor 102 to calculate the direction of motion of the user's handheld device 101 and uses this information to correctly generate motion of particles. In addition, there is provided a method to dynamically update the time varying bias parameters of the IMU sensor 102. The bias parameters are calculated by the subsystem 104, which uses the same information and simultaneously solves for time varying IMU bias parameters, smoothened trajectory tracking and optimized BLE mapping.

In one or more embodiments, during a pre-processing step, median filter is applied to IMU and magnetometer signals to remove noise. However, the BLE signals depend on the availability of a link between the beacon and the receiver; as such, the filtering is only possible when there is a sufficient sequence of the RSSI. After this pre-processing step, a simplified free space path-loss model is used to convert RSSI to range measurements.

In one or more embodiments, the described probabilistic IMU motion model serves as the proposal distribution for the particle filter algorithm. In contrast to the random walk motion model, which is used in absence of the IMU sensor, the probabilistic IMU motion model enables the localization algorithm to exhibit a probabilistically grounded predictive behavior of the motion of the device and hence enables the Particle Filter loop 105 to perform better device tracking. Using the 9-axis IMU sensor 102, the aforesaid probabilistic IMU motion model solves for Attitude and Heading Reference System (AHRS) problem to estimate the orientation of the device 101. It should be noted that because the magnetometer senses the direction of the Earth gravitational field, the reference system is the North-East-Down coordinate system. Note that the localization coordinate system does not need to follow this convention. Subsequently, by exploiting the underlying dynamics of the IMU sensor 102, the system samples the tangential acceleration along the current orientation of the device 101. Finally, the described approach uses a discrete-time dynamic system and the given sampling time to compute each particle's (device pose hypothesis) position and velocity.

In one or more embodiments, the described method additionally solves the problem of calculating the time varying bias parameters and utilizes them in updating the AHRS, which in turn is used by the probabilistic IMU motion model. The time varying bias is calculated using an incremental Smoothing and Mapping (iSAM) algorithm, which fuses the BLE scan with IMU data to calculate the time varying bias. The iSAM algorithm, well known in the art, works as a complementary subsystem to the Particle Filter localizer and continuously updates the bias parameters of the IMU sensor.

Finally, because the IMU sensor samples at a higher frequency than the BLE receiver, the AHRS solver runs with a higher frequency to use all available measurements, which, in turn, improve the orientation estimation accuracy. This improves the performance of the probabilistic IMU motion model as it utilizes the latest device orientation.

In one or more embodiments, the combination of the probabilistic IMU motion model and updating the bias parameters on the fly results in a better performance of the localization and tracking algorithms of the handheld devices using the Particle Filter framework.

Figure 2:
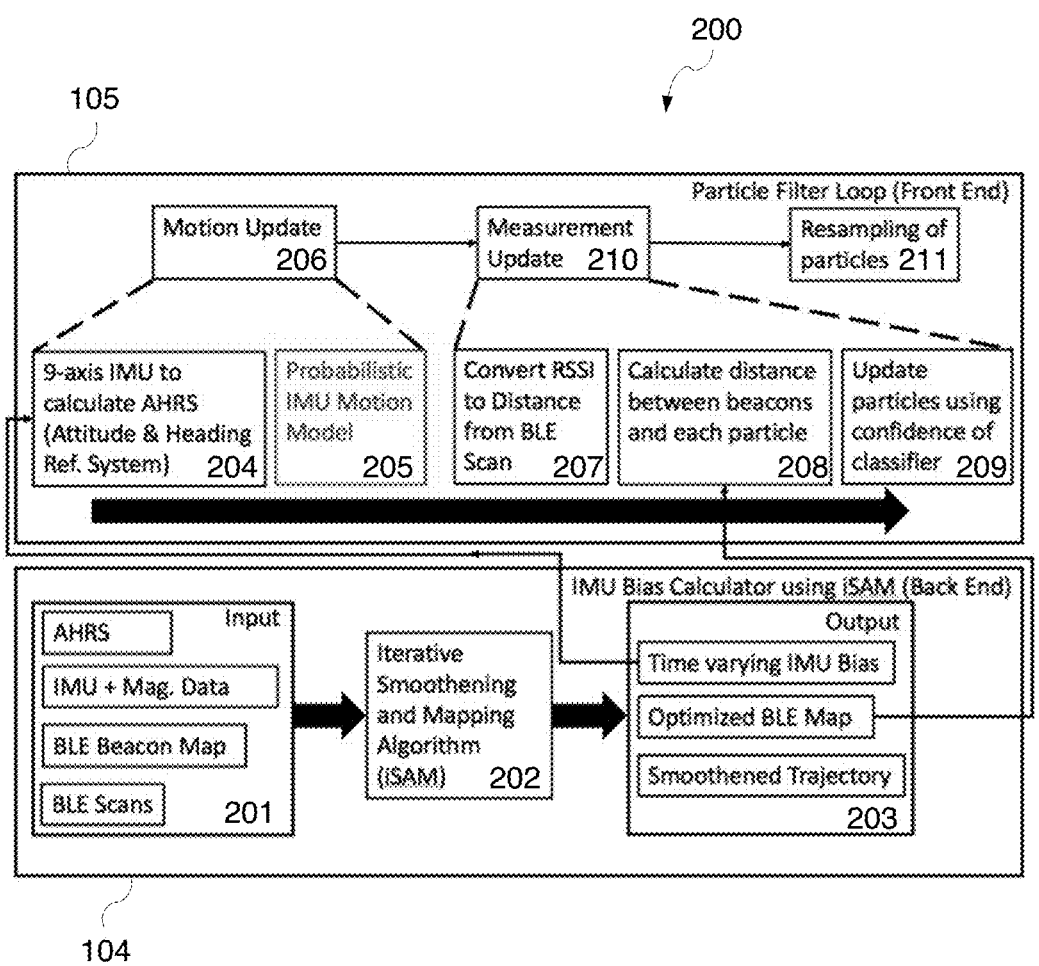
FIG. 2 illustrates an exemplary flow chart of an embodiment of the invention detailing the flow of sensor information between its various components.

An exemplary embodiment of the inventive localization and tracking system will now be described. FIG. 2 illustrates an exemplary flow chart 200 of an embodiment of the invention detailing the flow of sensor information between its various components. In one or more embodiments, the described localization and tracking system implementing the flow chart 200 is suitable for GPS-denied indoor environments and incorporates two subsystems 104 and 105, which work in parallel. The first subsystem 105 incorporates the aforesaid sequential Monte-Carlo Particle Filter algorithm, which solves the problem of localization in a given environment. In one or more embodiments, the aforesaid Particle Filter algorithm sequentially processes the sensory information in different steps to estimate the posterior probability distribution of the location of the user handheld device 101. In the first, motion update step 206 of the aforesaid algorithm, the system solves for the orientation of the handheld device 101 using the aforesaid AHRS, calculated from the IMU data in step 204, and sample data from the IMU dynamics to generate particles along the moving direction, see step 205 in FIG. 2. In the measurement update step 210, using range measurements accumulated from the BLE scans, importance weights of particles are computed. This step 210 involves first converting received signal strength indicator (RSSI) obtained from the BLE scan, see sub-step 207, to distance to determine the distance between the respective BLE beacons and each particle, see sub-step 208. Subsequently, at sub-step 209 particles are updated using the respective confidence classifier. Finally, in the resampling step 211 in FIG. 2, particles with higher weights are replicated and all weights are set uniformly. The aforesaid motion update, measurement update and resampling steps are repeated sequentially.

In one or more embodiments, the second subsystem 104 shown in FIG. 2, which operates in parallel with the Particle Filter loop 105, also called the back-end subsystem, utilizes optimization algorithm to further minimize the error of the Particle Filter estimates. IN various embodiments, the back-end 104 includes an incremental optimization (smoothing) algorithm to minimize the error in the front-end estimates. Given AHRS output, IMU measurements, a prior map of BLE beacons, and range measurements (converted RSSI) the optimization algorithm simultaneously solves for time-varying IMU bias, the feature map of BLE beacons, and the entire device trajectory. The resultant trajectory is smooth and continuous, unlike PF output, due to the motion constraints enforced by the IMU measurements. Furthermore, the estimated IMU bias is fed to the AHRS algorithm to improve the attitude estimation; and the optimized BLE map is used in the measurement update 210. This closed-loop architecture improves the localization accuracy significantly. In one exemplary embodiment, the system usesiSAM2 algorithm and the GTSAM library as the back-end solver.

In one embodiment, the back end 104 utilizes the aforesaid AHRS, IMU measurement, including magnetic field data, range measurements calculated from BLE scans and BLE map information (collectively, 201) and solves for the time varying IMU bias, optimizes feature map of BLE beacons and entire device trajectory, see step 202 in FIG. 2. The estimated IMU bias is subsequently fed back into the motion update of Particle Filter, which compensates for the bias noise in IMU sensor and hence improves the accuracy of the probabilistic IMU motion model, see output 203 in FIG. 2.

As would be appreciated by persons of ordinary skill in the art, the probabilistic IMU Motion Model 205 in the particle filter loop 105 is an advantageous method compared to more traditional Pedestrian Dead Reckoning (PDR). In one embodiment, the system utilizes the heading calculated by the AHRS system in step 204 in FIG. 2 and accelerometer sensor to sample tangential acceleration along the handheld device's current orientation.

As would be appreciated by persons of ordinary skill in the art, in traditional Pedestrian Dead Reckoning (PDR)—Particle Filter based localization system, step counter is used to deterministically calculate the steps taken by user, which is further used to calculate displacement of the smart device user. In J. Racko, P. Brida, A. Perttula, J. Parviainen, and J. Collin, "Pedestrian Dead Reckoning with Particle Filter for handheld smartphone," in 2016 International Conference on Indoor Positioning and Indoor Navigation (IPIN), 2016, pp. 1-7, the authors utilize a fixed displacement and fuse it with heading angle calculated using gyroscope. On the other hand, H. Nurminen, A. Ristimäki, S. Ali-Löytty, and R. Piché, "Particle filter and smoother for indoor localization," in International Conference on Indoor Positioning and Indoor Navigation, 2013, pp. 1-10, utilized combination step detection, orientation, map and WLAN info to estimate the position of the user. On the other hand, the described probabilistic IMU routine updates the displacement in a probabilistic manner by incorporating information from the accelerometer and hence is more robust and accounts for user dynamics such as change in walking speed.

Computing Platform

Figure 3:
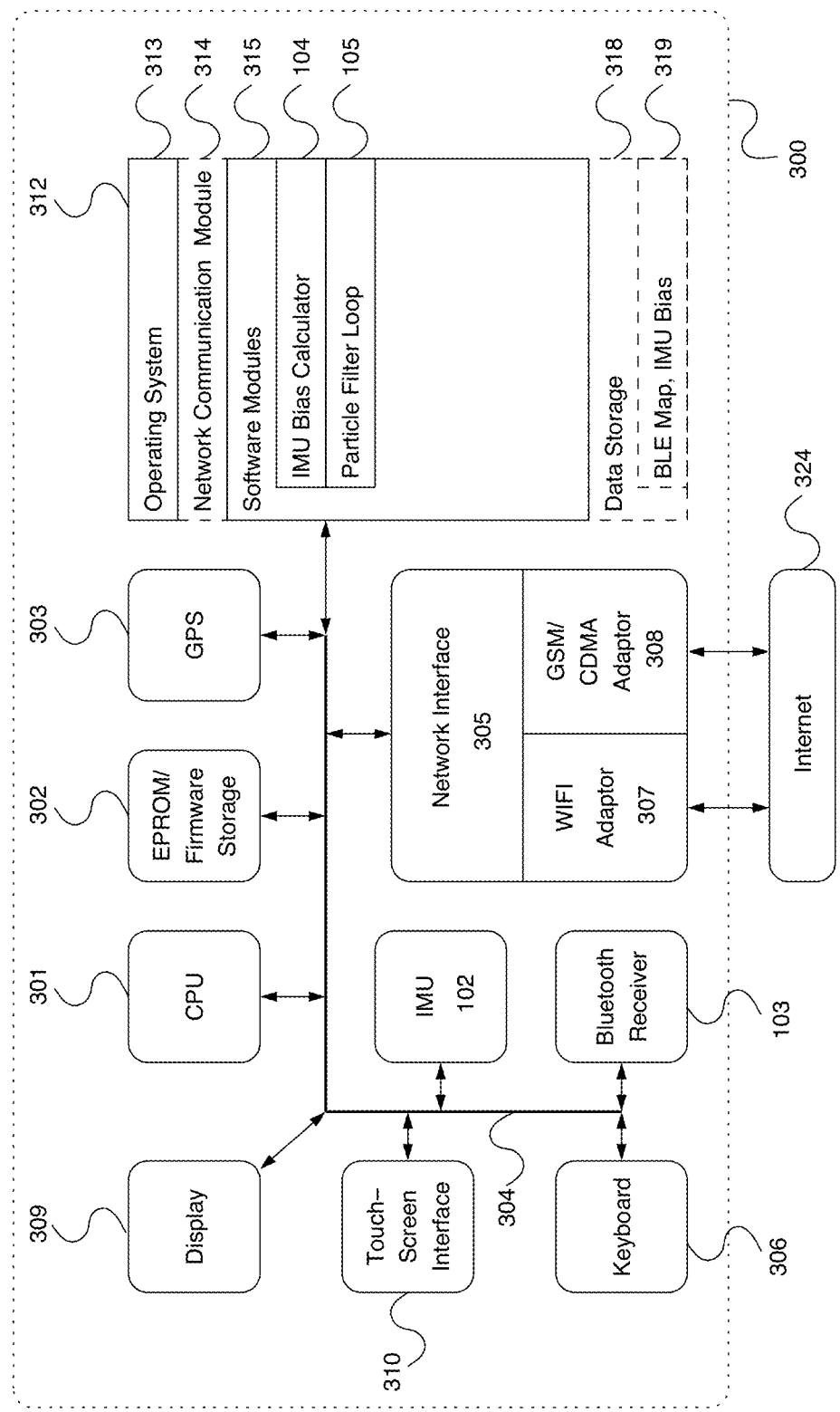
FIG. 3 illustrates an exemplary embodiment of a computerized mobile system that could be used as the handheld client device in connection with the system illustrated in FIG. 1.

FIG. 3 illustrates an exemplary embodiment of a computerized mobile system 300 that could be used as the handheld client device 101 in connection with the system illustrated in FIG. 1. In one or more embodiments, the computerized mobile system 300 may be implemented within a form factor of a mobile computing device, such as a smartphone, a personal digital assistant (PDA), a tablet computer, or a smart watch, all of which are widely available commercially and are well known to persons of skill in the art.

The computerized system 300 may include a data bus 304 or other interconnect or communication mechanism for communicating information across and among various hardware components of the mobile computerized system 300, and a central processing unit (CPU or simply processor) 301 coupled with the data bus 304 for processing information and performing other computational and control tasks. Computerized system 300 also includes a memory 312, such as a random access memory (RAM) or other dynamic storage device, coupled to the data bus 304 for storing various information as well as instructions to be executed by the processor 301. The memory 312 may also include persistent storage devices, such as a magnetic disk, optical disk, solid-state flash memory device or other non-volatile solid-state storage devices.

In one or more embodiments, the memory 312 may also be used for storing temporary variables or other intermediate information during execution of instructions by the processor 301. Optionally, computerized system 300 may further include a read only memory (ROM or EPROM) 302 or other static storage device coupled to the data bus 304 for storing static information and instructions for the processor 301, such as firmware necessary for the operation of the computerized system 300, basic input-output system (BIOS), as well as various configuration parameters of the computerized system 300.

In one or more embodiments, the computerized system 300 may incorporate a display device 309, which may be also coupled to the data bus 304, for displaying various information to a user of the computerized system 300. In an alternative embodiment, the display device 309 may be associated with a graphics controller and/or graphics processor (not shown). The display device 309 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 309 may be incorporated into the same general enclosure with the remaining components of the computerized system 300. In an alternative embodiment, the display device 309 may be positioned outside of such enclosure.

In one or more embodiments, the computerized system 300 may further incorporate a GPS receiver 303 connected to the data bus 304 and configured to receive location information from one or more GPS satellites and transmit this information to the processor 301 via the data bus 304.

In one or more embodiments, the computerized system 300 may incorporate one or more input devices, such as a touchscreen interface 310 for receiving tactile commands and a keyboard 306, which all may be coupled to the aforesaid data bus 304 for communicating information, including, without limitation, user command selections to the processor 301. In an alternative embodiment, input devices may include a system for tracking eye movements of the user (not shown), which may be used to indicate to the computerized system 300 the command selection by the user.

In one or more embodiments, the computerized system 300 may additionally include a location signal receiver 103, such as a Bluetooth receiver, configured to perform scan for beacons 106 and supply scan data described above to the processor 301 via the data bus 304. In addition, the IMU 102 may be also connected to the data bus 304.

In one or more embodiments, the computerized system 300 may additionally include a communication interface, such as a network interface 305 coupled to the data bus 304. The network interface 305 may be configured to establish a connection between the computerized system 300 and the Internet 324 using at least one of WIFI interface 307 and the cellular network (GSM or CDMA) adaptor 308. The network interface 305 may be configured to provide a two-way data communication between the computerized system 300 and the Internet 324. The WIFI interface 307 may operate in compliance with 802.11a, 802.11b, 802.11g and/or 802.11n protocols as well as Bluetooth protocol well known to persons of ordinary skill in the art. In an exemplary implementation, the WIFI interface 307 and the cellular network (GSM or CDMA) adaptor 308 send and receive electrical or electromagnetic signals that carry digital data streams representing various types of information. For example, the aforesaid networking components may be used to establish a network data connection between the computerized system 300 and other network components.

In one or more embodiments, the Internet 324 typically provides data communication through one or more sub-networks to other network resources. Thus, the computerized system 300 is capable of accessing a variety of network resources located anywhere on the Internet 324, such as web servers, other content servers as well as other network data storage resources. In one or more embodiments, the computerized system 300 is configured send and receive messages, media and other data, including application program code, through a variety of network(s) including Internet 324 by means of the network interface 305. In the Internet example, when the computerized system 300 acts as a network client, it may request code or data for an application program executing on the computerized system 300. Similarly, it may send various data or computer code to other network resources.

In one or more embodiments, the functionality described herein is implemented by computerized system 300 in response to processor 301 executing one or more sequences of one or more instructions contained in the memory 312. Such instructions may be read into the memory 312 from another computer-readable medium. Execution of the sequences of instructions contained in the memory 312 causes the processor 301 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 301 for execution. For example, the instructions may initially be carried on a magnetic disk from a remote computer. Alternatively, a remote computer can load the instructions into its dynamic memory and send the instructions over the Internet 324. Specifically, the computer instructions may be downloaded into the memory 312 of the computerized system 300 from the foresaid remote computer via the Internet 324 using a variety of network data communication protocols well known in the art.

In one or more embodiments, the memory 312 of the computerized system 300 may store any of the following software programs, applications or modules:

1. Operating system (OS) 313, which may be a mobile operating system for implementing basic system services and managing various hardware components of the computerized system 300. Exemplary embodiments of the operating system 313 are well known to persons of skill in the art, and may include any now known or later developed mobile operating systems.

2. Network communication module 314 for enabling network communications using one or more network interfaces described below.

3. Software modules 315 may include, for example, a set of software applications executed by the processor 301 of the computerized system 300, which cause the computerized mobile system 300 to perform certain predetermined functions, such as receive the beacon signals as described above. In one or more embodiments, the software modules 315 may include, for example, the IMU bias calculator 104 as well as Particle Filter loop 105, also shown in FIGS. 1 and 2.

4. Data storage 318 may be used, for example, for storing the bacon scan data, beacon map(s) and IMU bias data 319.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in calibration-less motion model and method to dynamically compensate bias of inertial measurement unit sensor for localization and tracking algorithm. It is intended that the specification and examples be considered as exemplary only, with a true scope and spirit of the invention being indicated by the following claims.

What is claimed is:

1. A computer-implemented method, the method being performed in a computerized system comprising a central processing unit, a Bluetooth localization signal receiver, a plurality of sensors, separate and distinct from the Bluetooth localization signal receiver, and a memory, the computer-implemented method comprising:
   receiving at least one Bluetooth localization signal using the Bluetooth localization signal receiver;
   obtaining a plurality of sensor readings using the plurality of sensors; and
   continuously executing a particle filter loop that includes a probabilistic motion model to iteratively determine motion parameters of the computerized system based at least on the received Bluetooth localization signal and the received plurality of sensor readings;
   without regard to outputs from the particle filter loop, iteratively and dynamically determining time-varying bias parameters associated with the plurality of the sensors and generating an optimized Bluetooth beacon map; and
   iteratively feeding the determined time-varying bias parameters into probabilistic motion model and providing the optimized Bluetooth beacon map to the particle filter loop, wherein the motion parameters of the computerized system are determined based, at least in part, on the iteratively determined time-varying bias parameters from the probabilistic motion model without requiring a prior calibration of the plurality of sensors.

2. The computer-implemented method of claim 1, wherein determining the motion parameters of the computerized system comprises estimating an orientation of the computerized system based on a first plurality of sensor readings, and wherein the method further comprises determining the time-varying bias parameters and an optimized Bluetooth beacon map corresponding to the received Bluetooth localization signal, and based on the orientation of the computerized system, the plurality of sensor readings, a prior Bluetooth beacon map corresponding to the received Bluetooth localization signal, and the received Bluetooth localization signal.

3. The computer-implemented method of claim 1, wherein the plurality of sensor readings does not include global positioning system (GPS) information.

4. The computer-implemented method of claim 1, wherein the Bluetooth localization signal is a Bluetooth low energy signal corresponding to at least one Bluetooth low energy beacon.

5. The computer-implemented method of claim 1, wherein determining the motion parameters of the computerized system comprises dynamically updating time-varying bias parameters for the plurality of sensors.

6. The computer-implemented method of claim 5, wherein the time-varying bias parameters for the plurality of sensors are updated using the received Bluetooth localization signal.

7. The computer-implemented method of claim 5, wherein the time-varying bias parameters for the plurality of sensors are updated using an iterative smoothing and mapping algorithm (iSAM).

8. The computer-implemented method of claim 5, wherein the time-varying bias parameters for the plurality of sensors are updated using a Bluetooth beacon map corresponding to the received Bluetooth localization signal.

9. The computer-implemented method of claim 5, wherein continuously executing the particle filter loop and continuously dynamically updating the time-varying bias parameters are performed in parallel.

10. The computer-implemented method of claim 5, wherein continuously dynamically updating the time-varying bias parameters for the plurality of sensors comprises generating a smoothened trajectory data.

11. The computer-implemented method of claim 1, wherein the plurality of sensors comprises a magnetometer sensor.

12. The computer-implemented method of claim 1, wherein the plurality of sensors comprises an acceleration sensor.

13. The computer-implemented method of claim 1, wherein the plurality of sensors are incorporated into an inertial measurement unit (IMU).

14. The computer-implemented method of claim 1, further comprising using the motion parameters of the computerized system to generate localization data associated with the computerized system.

15. The computer-implemented method of claim 1, wherein sequentially executing the particle filter loop comprises performing a motion update, performing a measurement update and resampling a plurality of particles.

16. The computer-implemented method of claim 15, wherein performing the measurement update comprises calculating a distance between each of a plurality of particles and at least one Bluetooth low energy beacon based on the received Bluetooth localization signal.

17. The computer-implemented method of claim 15, wherein performing the measurement update comprises updating a plurality of particles using a confidence of a classifier.

18. The computer-implemented method of claim 15, wherein resampling the plurality of particles comprises calculating a weight for each of a plurality of particles and replicating particles of the plurality of particles with higher weights.

19. The computer-implemented method of claim 1, wherein the motion parameters of the computerized system are determined based, at least in part, on a strength of the received Bluetooth localization signal.

20. A non-transitory computer-readable medium embodying a set of computer-executable instructions, which, when executed in connection with a system comprising a central processing unit, a Bluetooth localization signal receiver, an inertial measurement unit, separate and distinct from the Bluetooth localization signal receiver, and a memory, cause the system to perform a method comprising:
   receiving at least one Bluetooth localization signal using the Bluetooth localization signal receiver;
   obtaining a plurality of sensor readings using the plurality of sensors; and
   continuously executing a particle filter loop that includes a probabilistic motion model to iteratively determine motion parameters of the computerized system based at least on the received Bluetooth localization signal and the received plurality of sensor readings;
   without regard to outputs from the particle filter loop, iteratively and dynamically determining time-varying bias parameters associated with the plurality of the sensors and generating an optimized Bluetooth beacon map; and
   iteratively feeding the determined time-varying bias parameters into probabilistic motion model and providing the optimized Bluetooth beacon map to the particle filter loop, wherein the motion parameters of the computerized system are determined based, at least in part, on the iteratively determined time-varying bias parameters from the probabilistic motion model without requiring a prior calibration of the plurality of sensors.

21. A system comprising a central processing unit, a Bluetooth localization signal receiver, an inertial measurement unit, separate and distinct from the Bluetooth localization signal receiver, and a memory, the memory storing a set of computer-readable instructions causing the system to perform a method comprising:
   receiving at least one Bluetooth localization signal using the Bluetooth localization signal receiver;
   obtaining a plurality of sensor readings using the plurality of sensors; and
   continuously executing a particle filter loop that includes a probabilistic motion model to iteratively determine motion parameters of the computerized system based at least on the received Bluetooth localization signal and the received plurality of sensor readings;
   without regard to outputs from the particle filter loop, iteratively and dynamically determining time-varying bias parameters associated with the plurality of the sensors and generating an optimized Bluetooth beacon map; and
   iteratively feeding the determined time-varying bias parameters into probabilistic motion model and providing the optimized Bluetooth beacon map to the particle filter loop, wherein the motion parameters of the computerized system are determined based, at least in part, on the iteratively determined time-varying bias parameters from the probabilistic motion model without requiring a prior calibration of the plurality of sensors.

* * * * *